Dec. 6, 1960  T. PEDERZANI ET AL  2,963,700
SCANNING SYSTEM AND METHOD
Filed Feb. 8, 1956

INVENTORS
THEODOR PEDERZANI
WILHELM GRIMM &
KARL STEIMEL

BY

PATENT AGENT

United States Patent Office 2,963,700
Patented Dec. 6, 1960

2,963,700

SCANNING SYSTEM AND METHOD

Theodor Pederzani and Wilhelm Grimm, Ulm (Danube), and Karl Steimel, Ulm-Soflingen (Danube), Germany, assignors to Telefunken G.m.b.H., Berlin, Germany Filed Feb. 8, 1956, Ser. No. 564,298

6 Claims. (Cl. 343—11)

This invention relates to a system and a method of supervising airways by means of scanning apparatus.

Supervision of the airways to avoid collisions of aircraft in flight is urgently needed in view of the steadily increasing density of air traffic. Usually the flight routes are divided into a plurality of different flight levels, often in steps of several hundred feet and the commercial planes are instructed by radio as to which flight level to maintain. The airways are frequently crossed by non-commercial aircraft which are often unequipped with two-way radio, or are otherwise out of radio contact so that they cannot be given flight instructions. Therefore, the commercial airplanes or larger aircraft have to be instructed to avoid levels assigned to non-commercial planes. In view of these conditions, it appears desirable to scan the flight routes of all of the aircraft using the airways and to transmit the resulting information to a central station, for example, the airfield control tower. It has been known to supervise aircraft by means of radio apparatus, such as radar systems.

It has already been suggested to assign a certain zone of a flight route to a radar apparatus adapted to scan this zone in a fan-like pattern 1, 1a, shown in Figs. 1 and 2 of the attached drawing, in elevation and in plan view, respectively. If, for example, the radar apparatus at 2 has a range of 16 miles, it is possible according to Fig. 2 to scan the width 3, of the flight route toward each side for a distance of 16 miles, i.e., to scan a total of 32 miles. From the distance $e$ (see: Fig. 1) and the instantaneous elevational angle $\gamma$, measured by means of the radar apparatus, the altitude of an airplane can be calculated with the aid of the formula: $h = e \sin \gamma$.

This method results in considerable error in the case of targets at low altitude with respect to the radar apparatus at 2. In an extreme case, the altitude of an airplane being actually on the ground might be ascertained by the apparatus as having an altitude which corresponds to the value $e$ in Fig. 1. Such errors could be corrected in most cases by means of a calculating device. However, such procedure would be time-consuming and expensive.

It is an object of this invention to provide a control system for a flight route by placing a plurality of radar scanners along this route and so directing these scanners that their beams scan horizontal zones of the flight route along vertically oscillating planes.

It is a further object of the invention to provide these radar scanners at such distances from one another and to design the indicator units, such as oscilloscopes, of each of these scanners in such a manner that on the screens of these indicator units only such targets appear as are located within the scanning beam of the particular scanner and at some distance from the scanner, whereby the elevational angles for these targets are relatively small and these units indicate the distance as well as the elevational angle of the signal reflected from the target in flight. In this manner, errors occurring in measuring tests taken in the immediate neighborhood of the scanning apparatus are avoided, because each of the radar scanners indicates targets in the next adjacent air route zone only, for which the elevational angles of the flight altitudes in question are relatively small. By suitably selecting these flight route zones to be scanned, the error of indication of a target flying somewhat off center in the flight route can be kept within permissible limits.

These and other objects and advantageous features of this invention will be apparent from the following detailed description and drawing appended thereto, wherein merely for the purpose of disclosure, non-limitative embodiments of the invention are set forth.

Figure 1:
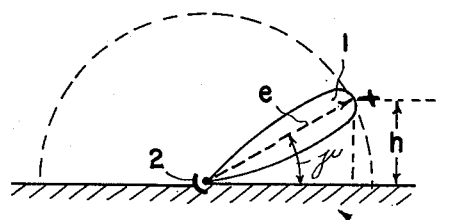
Figs. 1 and 2 show in elevation and plan view, respectively, prior art scanning methods (already discussed).
Figure 2:
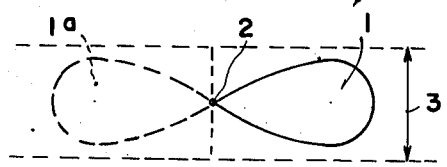
Figure 3:
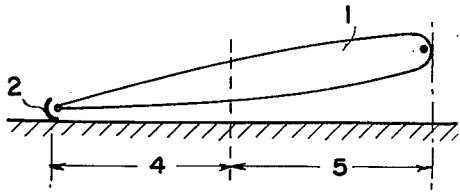
Figs. 3 and 4 show in elevation and plan view, respectively, a scanning pattern according to the invention.
Figure 4:
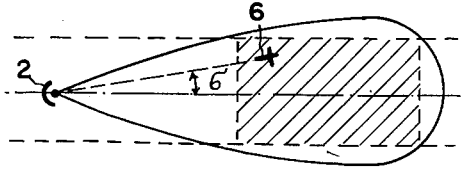

The scanning apparatus in Figs. 3 and 4 is denoted by 2 as in Figs. 1 and 2. The beam 1 generated by this apparatus is divided in two parts or zones 4 and 5. Only those targets will be considered in the indication which are located within the zone 5. As shown in Fig. 4, a target flying at a distance from the center of the flight route has a relatively small azimuth angle $\delta$, so that the error in the altitude indication of this target will be correspondingly small.

Figure 5:
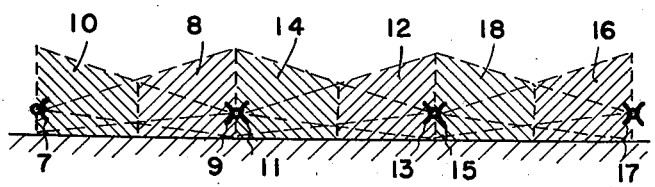
Figs. 5 and 6 show schematically two examples of radar scanners distributed according to the invention along a flight route to be supervised.

An example of distribution of a plurality of such scanners along a flight route of greater length is shown diagrammatically in Fig. 5. Always two of the scanners are placed back-to-back and facing in opposite directions. Each of these scanners scans the next more distant zone rather than the immediately adjacent zone. Thus the apparatus 7 in Fig. 5 scans the zone 8, the apparatus 9 scans the zone 10, the apparatus 11 scans the zone 12, the apparatus 13 scans the zone 14, the apparatus 15 scans the zone 16, and the apparatus 17 scans the zone 18. If, for example, the distance between each of the scanners is 31 miles, a total of six scanners is required for a flight route of 93 miles length. In practice the individual zones will not be of uniform length, because the conditions of the topography will require that these zones have lengths different from one another.

Figure 6:
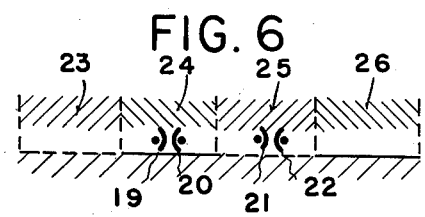

In the embodiment of Fig. 6, the zones are chosen and the scanners arranged in such a manner that the zone in which a scanner lies and which is not scanned thereby is smaller than the zone to be scanned by said scanner, i.e., in the example shown, these non-scanned zones are only ½ of the length of the scanned zones. In Fig. 6, a total of four scanners is illustrated, of which the scanners 19, 20 and the scanners 21, 22 are respectively placed with their backs towards each other. The apparatus 19 scans the zone 23, the apparatus 20 scans the zone 25, the apparatus 21 scans the zone 24, and the apparatus 22 scans the zone 26. Such a system has the advantage that information from the zone in front of a scanner is not presented, so that obstructions, such as mountains, buildings, or the like, will not appear in the indicator unit to disturb the useful information.

In addition to the avoidance of the considerable measuring error mentioned in the foregoing, the system in accordance with this invention has the advantage that the powerful reflections occurring at the neighborhood of zero distance will be eliminated.

The two scanners located at the same location, such as for example 9 and 11 in Fig. 5, may be operated at the same frequency supplied by the same oscillator, so that not all of the components at this location need be duplicated. In many cases, it will be possible to use the same transmitter and to transmit the impulses by means of the scanners 9 and 11 alternately, i.e. consecutively.

Frequently it will be advantageous to avoid interfering reception by selecting, in a manner known per se, a low enough repetition rate for the pulses, or each second, or even each second and third transmitter pulse may be omitted. By the use of such system the possibility may be avoided that targets might be viewed which are at a distance from the scanner which is larger than the oscillograph range provided.

In accordance with a further development of the invention, a cathode ray tube is used for indicating the targets, said tube indicating a zone which is a side elevational view of the flight route. It is possible to arrange a series of such tubes side by side in the central station, so that a composite view over the total length of the flight route will be possible.

Figure 7:
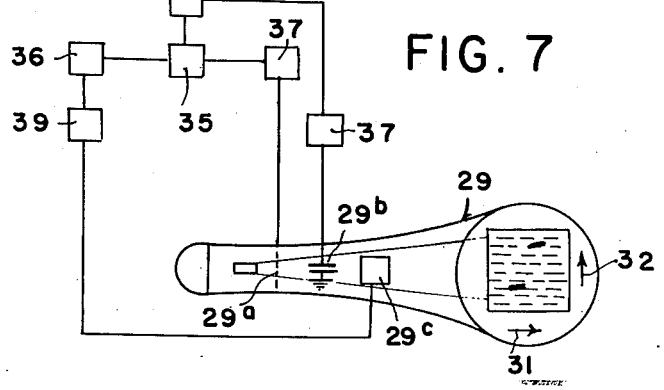
Fig. 7 shows a block diagram illustrating the components to be used in conjunction with one scanner according to the invention.

Fig. 7 shows the presentation on the screen of a cathode ray tube 29 according to this invention. The airplanes appear at the correct altitude represented by an arrow 32 above the range indications represented by an arrow 31. Lines indicating the altitude can be provided directly on the tube screen, as shown by the horizontal dotted lines. Indication of this type is obtained by deflecting the beam of the oscillograph in two directions which are mutually perpendicular on the one hand, in dependence on a time function synchronized by the repetition rate, and on the other hand, in dependence on the angular displacement of the scanning beam, whereby the deflection is in the direction of the arrow 32.

The cathode ray tube will be connected in a radar system which may be of the type illustrated in Fig. 7. In this figure, a scanner 33 may be connected to an elevation control device 34 which either electrically or mechanically sweeps the scanner beam 33a up and down in a vertical direction. The propagating element of the scanner 33 will be connected to a conventional T-R Box 35 which automatically shifts the connection of the scanner 33 alternately between the transmitter 36 and the receiver 37. The output of the receiver 37 is connected to the intensity control grid 29a of the tube 29, in the well known manner. A vertical sweep circuit 38 is provided, the output being connected to the vertical deflection means 29b of the tube 29, and the sweep circuit 38 being synchronized with a signal obtained from the elevation control device 34 to produce a deflection proportional to the elevation angle of the beam 33a. A horizontal sweep circuit 39 is designed to provide a linear sweep to the horizontal deflection means 29c of the tube 29, the initiation of the linear sweep being controlled by a synchronizing connection from the sweep circuit 39 to the repetition rate control of the transmitter 36. Suitable delay means may be provided in the circuit 39 to delay initiation of the sweep so that it will cover only the zone being scanned.

The information obtained by the scanners may be transmitted to a control tower in accordance with known long distance transmission methods, whereby a single telephone channel will suffice for the transmission of the information content. Such a channel permits the transmission of approximately 6,000 picture points which may be scanned from the picture by means of an electrical or an optical apparatus. It is also possible to produce such pictures only at the central station, rather than produce them at the location of the scanners.

If 6.000 picture points are not sufficient for a good presentation of the information, it is possible to operate in accordance with an interlacing method, similar to those known in television systems, i.e., to transmit for the first picture only the image lines 1, 3, 5, etc. and for the second picture, the image lines 2, 4, 6, etc. In this way it will be possible to produce relatively good presentations by means of a channel of narrow band width.

From the presentation shown in Fig. 7, it cannot be seen whether or not the indicated targets are above the center of the flight route or are off to one side thereof.

Figure 8:
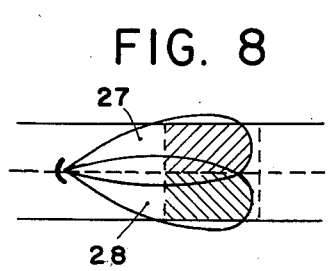
Fig. 8 shows in plan view a modified scanning pattern.

If this additional requirement with respect to the indication is to be met, the scanner apparatus has to be designed in such a manner that separate right and left halves of the flight route are scanned. This may be done with the aid of two separate antenna systems or by consecutive use of a single antenna. A diagram for such operation is shown in Fig. 8. It is possible with such a system to present the reflected pulses received from the two beam patterns 27 and 28 on separate cathode ray tubes, so that an observer can recognize whether a new target appearing on the screen has entered the route from the right or from the left side. A similar method may be used employing more than two like beam patterns.

Although in accordance with the provisions of the patent statutes this invention is described as embodied in concrete forms and the principle of the invention has been explained together with the best modes in which it is now contemplated applying that principle, it will be understood that the elements and combinations shown and described are merely illustrative and that the invention is not limited thereto, since alterations and modifications will readily suggest themselves to persons skilled in the art without departing from the true spirit of the invention or from the scope of the annexed claims.

We claim:

1. A supervisory system for scanning a longitudinal flight route, which route is divided transversely into individual adjacent zones, said system comprising a radar pulse-echo apparatus assigned to each zone, each radar apparatus comprising a pulse transmitter, a scanner, an indicator unit and an echo receiver, each scanner being located on the route outside of and facing the zone to which it is assigned, and displaced longitudinally of the route with respect thereto; elevation displacement means connected with the scanners for displacing the latter to search different elevations within the zones; sweep means in each indicator unit and connected with the transmitter and the displacement means for sweeping the associated indicator unit vertically in step with the displacement means and horizontally linearly after each pulse to indicate range; and gate means associated with the indicator units to blank out the pulse receiving intervals corresponding with ranges outside of the longitudinal zone assigned to each radar apparatus.

2. In a system according to claim 1, each scanner comprising a directional antenna having a horizontal-pattern width approximating the transverse width of the assigned zone and having a substantially planar vertical beam pattern scanning a narrow range of altitudes within said zone.

3. In a system according to claim 1, the scanners being located in pairs along the flight route intermediate its ends and the pairs being in mutually spaced relation, each pair of scanners being oppositely faced in a zone located between the zones searched by that pair.

4. In a system according to claim 3, the zones of said route being divided longitudinally into right and left halves; separate right and left indicator means at each indicator unit; and alternating means controlling the scanners and the associated indicator means for consecutively searching and indicating targets in said right and left halves.

5. In a system according to claim 1, said indicator units each including a cathode ray tube having a beam control grid coupled with the associated receiver to brighten the beam in response to a received echo, and having vertical and horizontal beam deflection means connected with said sweep means.

6. In a system according to claim 5, said cathode ray tubes being arranged side-by-side in the sequence of the flight zones to which they are assigned to provide a composite representation thereof.

References Cited in the file of this patent

UNITED STATES PATENTS

| | | |
|---|---|---|
| 2,399,426 | Bradley | Apr. 30, 1946 |
| 2,555,101 | Alvarez | May 29, 1951 |
| 2,571,386 | Sarnoff | Oct. 16, 1951 |
| 2,588,931 | Kendall | Mar. 11, 1952 |